(12) United States Patent
Urata et al.

(10) Patent No.: US 8,620,539 B2
(45) Date of Patent: Dec. 31, 2013

(54) CONTINUOUSLY-VARIABLE TRANSMISSION FOR VEHICLE

(75) Inventors: Takeshi Urata, Sagamihara (JP); Haruhisa Nakano, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 246 days.

(21) Appl. No.: 12/822,709

(22) Filed: Jun. 24, 2010

(65) Prior Publication Data

US 2011/0015833 A1 Jan. 20, 2011

(30) Foreign Application Priority Data

Jul. 15, 2009 (JP) ................................ 2009-166444

(51) Int. Cl.
*G06F 7/00* (2006.01)

(52) U.S. Cl.
USPC .......................................................... 701/51

(58) Field of Classification Search
None
See application file for complete search history.

(56) References Cited

U.S. PATENT DOCUMENTS

| | | | | |
|---|---|---|---|---|
| 4,793,217 A | * | 12/1988 | Morisawa et al. | 477/41 |
| 7,066,860 B2 | * | 6/2006 | Habuchi et al. | 475/208 |
| 7,706,950 B2 | * | 4/2010 | Hino et al. | 701/51 |
| 2001/0041644 A1 | * | 11/2001 | Yasuoka et al. | 477/37 |
| 2004/0014547 A1 | * | 1/2004 | Habuchi et al. | 475/210 |
| 2007/0118266 A1 | * | 5/2007 | Hino et al. | 701/51 |
| 2011/0034279 A1 | * | 2/2011 | Yamaguchi et al. | 474/17 |

FOREIGN PATENT DOCUMENTS

| | | |
|---|---|---|
| EP | 0 787 927 A2 | 8/1997 |
| GB | 2 144 814 A | 3/1985 |
| JP | 60-037455 A | 2/1985 |
| JP | 05-079554 A | 3/1993 |

* cited by examiner

*Primary Examiner* — Thomas Tarcza
*Assistant Examiner* — Adam Alharbi
(74) *Attorney, Agent, or Firm* — Foley & Lardner LLP

(57) ABSTRACT

A continuously-variable transmission for a vehicle includes a belt-type continuously-variable transmitting mechanism connected to a drive source and configured to continuously vary a speed ratio of the belt-type continuously-variable transmitting mechanism; an auxiliary transmitting mechanism provided in series with the belt-type continuously-variable transmitting mechanism and configured to attain a plurality of shift steps for a forward running of the vehicle; and a speed-increasing gear mechanism provided upstream from the auxiliary transmitting mechanism and configured to increase an input rotational speed of the auxiliary transmitting mechanism.

4 Claims, 8 Drawing Sheets

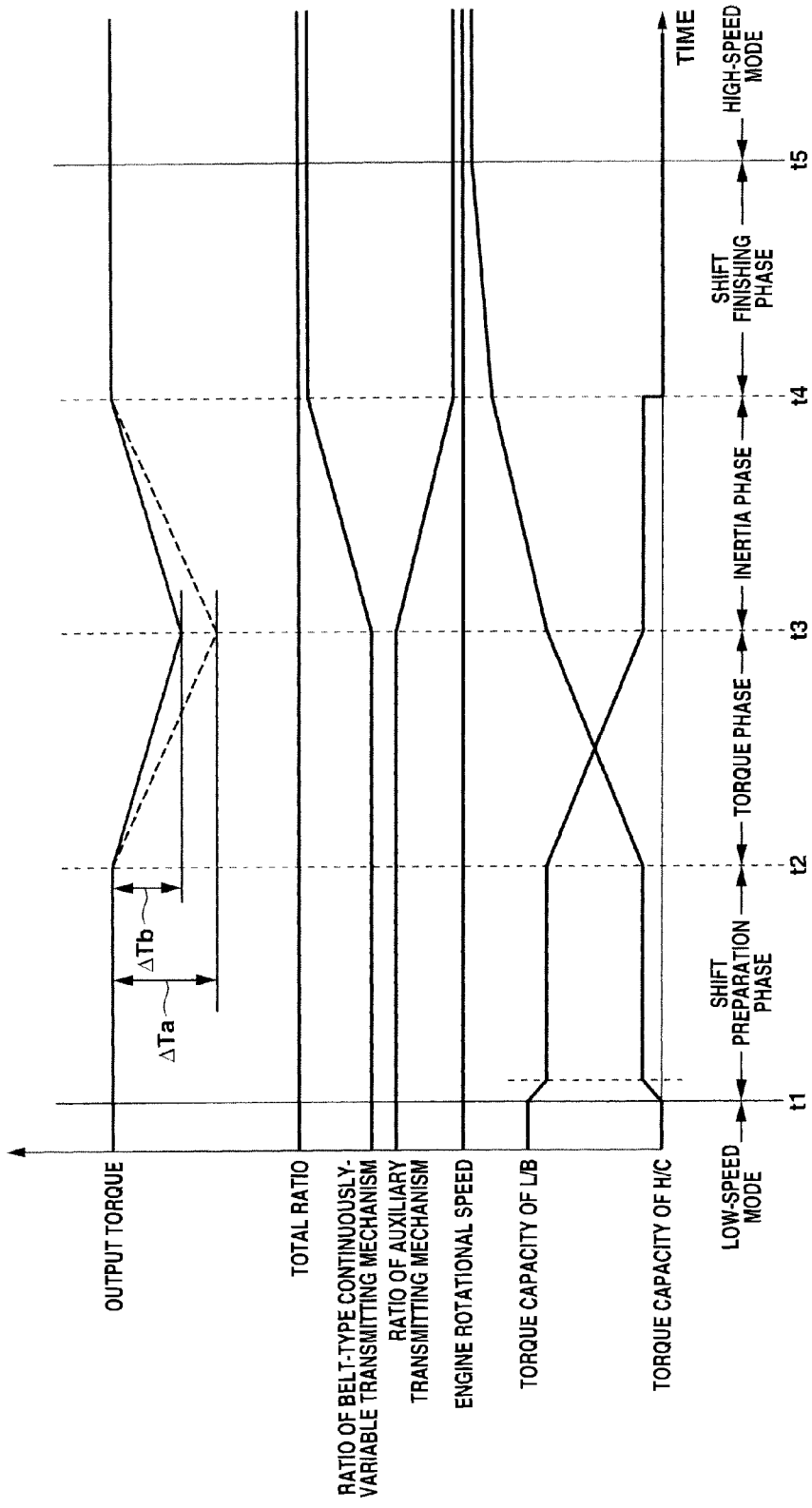

CONTINUOUSLY-VARIABLE TRANSMISSION FOR VEHICLE

BACKGROUND OF THE INVENTION

The present invention relates to a continuously-variable transmission for a vehicle, which includes a belt-type continuously-variable transmitting mechanism and an auxiliary transmitting mechanism disposed in series with the belt-type continuously-variable transmitting mechanism.

Japanese Patent Application Publication No. 60-037455 (corresponding to UK Patent Application Publication No. 2144814) discloses a previously-proposed continuously-variable transmission for a vehicle. In this technique, an auxiliary transmitting mechanism that can attain two shift steps (two speed ratios) for forward running of vehicle is provided in series with a belt-type continuously-variable transmitting mechanism, and the shift step of this auxiliary transmitting mechanism is changed according to a running state of vehicle. Thereby, obtainable range of speed ratio (i.e., obtainable speed-ratio width) of whole of the continuously-variable transmission is made larger without enlarging the size of belt-type continuously-variable transmitting mechanism.

Japanese Patent Application Publication No. 5-079554 discloses another previously-proposed continuously-variable transmission for a vehicle, which includes an auxiliary transmitting mechanism. In this technique, when a shift step (speed ratio) of the auxiliary transmitting mechanism is changed, a cooperative shift for varying a speed ratio of belt-type continuously-variable transmitting mechanism in synchronization with the shift of the auxiliary transmitting mechanism is performed so as to maintain a speed ratio of whole of the continuously-variable transmission (hereinafter referred to as "through speed ratio") at a constant level. According to the cooperative shift disclosed in this Japanese Patent Application Publication, rotational-speed variations of an engine and a torque converter at the time of shift of auxiliary transmitting mechanism are suppressed because to the through speed ratio is maintained at a constant level between before and after the cooperative shift. Accordingly, a shift shock which is caused due to inertia torques of the engine and torque converter is suppressed.

SUMMARY OF THE INVENTION

However, in a continuously-variable transmission for a vehicle which includes the belt-type continuously-variable transmitting mechanism and the auxiliary transmitting mechanism arranged in series with the belt-type continuously-variable transmitting mechanism, an output-shaft torque is reduced due to a changeover between a friction element to be engaged and a friction element to be released, during a phase called "torque phase" which occurs in an early stage of shift transient period of the auxiliary transmitting mechanism and for which an input rotational speed does not vary and only the output-shaft torque varies.

The cooperative shift for maintaining the through speed ratio at a constant level is effective in suppressing the shift shock during a phase called "inertia phase" which is a part of the shift transient period of auxiliary transmitting mechanism and for which the input rotational speed varies. However, this cooperative shift is not expected to suppress a shift shock in the "torque phase" for which the input rotational speed does not vary.

Accordingly, there has been a problem that a shift shock called "pull-in shock (depression shock)" occurs so as to largely damage a shift quality, due to the reduction of output-shaft torque during the "torque phase" at the time of shift of auxiliary transmitting mechanism.

It is therefore an object of the present invention to provide a continuously-variable transmission for a vehicle, devised to improve the shift quality at the time of shift of auxiliary transmitting mechanism while realizing the enlargement of speed-ratio width which attains a favorable responsiveness of vehicle start and a favorable energy saving.

According to one aspect of the present invention, there is provided a continuously-variable transmission for a vehicle, comprising: a belt-type continuously-variable transmitting mechanism connected to a drive source and configured to continuously vary a speed ratio of the belt-type continuously-variable transmitting mechanism; an auxiliary transmitting mechanism provided in series with the belt-type continuously-variable transmitting mechanism and configured to attain a plurality of shift steps for a forward running of the vehicle; and a speed-increasing gear mechanism provided upstream from the auxiliary transmitting mechanism and configured to increase an input rotational speed of the auxiliary transmitting mechanism.

The other objects and features of this invention will become understood from the following description with reference to the accompanying drawings.

BRIEF DESCRIPTION OF THE DRAWINGS

FIG. 8A shows a speed-line diagram under the low-speed mode. FIG. 8B shows a speed-line diagram under a mode-change transient state. FIG. 8C shows a speed-line diagram under the high-speed mode.

FIG. 11 a time chart showing respective characteristics of an output torque, the total ratio, the ratio of belt-type continuously-variable transmitting mechanism, the ratio of auxiliary transmitting mechanism, a rotational speed of engine, a torque capacity of low brake L/B and a torque capacity of high clutch H/C, at the time of upshift transition from the low-speed mode to the high-speed mode.

DETAILED DESCRIPTION OF THE INVENTION

Figure 1:
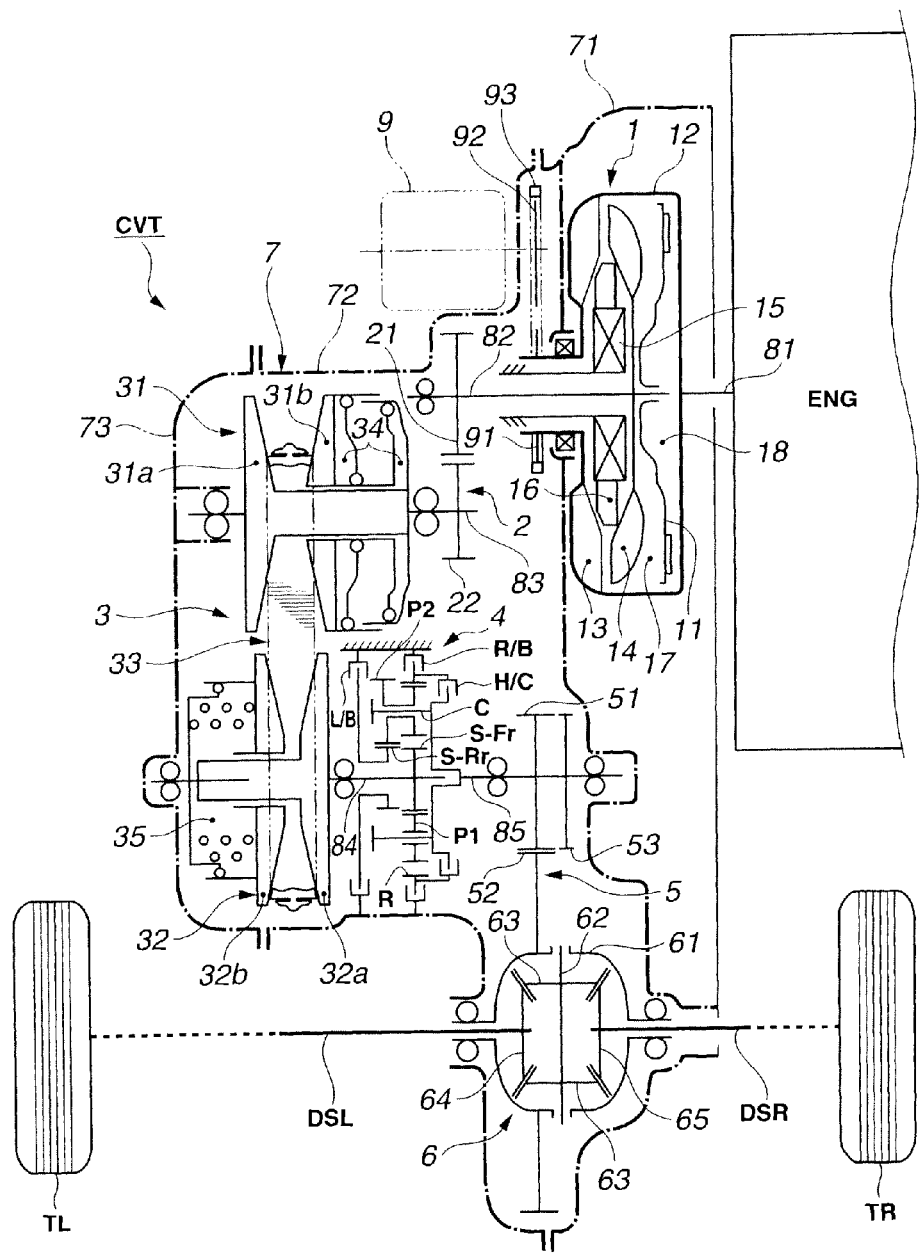
FIG. 1 is a schematic view showing an engine vehicle equipped with a continuously-variable transmission according to a first embodiment.

Hereinafter, embodiments of continuously-variable transmission according to the present invention will be explained referring to the drawings.

First Embodiment

At first, a configuration according to a first embodiment of the present invention will be explained. FIG. 1 is a schematic view showing an engine vehicle equipped with a continuously-variable transmission CVT according to the first embodiment. Hereinafter, a schematic configuration of the engine vehicle and a configuration of the continuously-variable transmission CVT will now be explained referring to FIG. 1.

As shown in FIG. 1, in the engine vehicle equipped with the continuously-variable transmission CVT according to the first embodiment; an engine ENG (drive source) is connected to an input-side portion of the continuously-variable transmission CVT, and a left drive shaft DSL and a right drive shaft DSR are connected to an output-side portion of the continuously-variable transmission CVT. A left drive wheel (roadwheel) TL is attached to an end portion of the left drive shaft DSL, and a right drive wheel TR is attached to an end portion of the right drive shaft DSR.

The engine ENG and the continuously-variable transmission CVT are mounted, for example, inside an engine room of FF vehicle (front-engine front-drive vehicle). Rotational driving force inputted from the engine ENG is varied by the continuously-variable transmission CVT. Outputs of the left and right drive shafts DSL and DSR are transmitted through the left and right drive wheels TL and TR to a road surface, so that the vehicle runs.

As shown in FIG. 1, the continuously-variable transmission CVT according to the first embodiment includes a torque converter 1, a counter gear mechanism (speed-increasing gear mechanism) 2, a belt-type continuously-variable transmitting mechanism (main transmission) 3, an auxiliary transmitting mechanism (secondary transmission) 4, a final reduction gear mechanism 5, and a differential mechanism 6. These structural elements are disposed in a transmission casing member 7. The transmission casing member 7 includes a converter housing 71, a transmission case 72 and a side cover 73.

The torque converter 1 functions as a starting element having a torque increasing function. The torque converter 1 includes a lockup clutch 11 which directly connects an engine output shaft 81 (=torque-converter input shaft) with a torque-converter output shaft 82 when the torque increasing function and a torque-variation absorbing function are unnecessary. The engine output shaft 81 is provided coaxially to the torque-converter output shaft 82. The torque converter 1 further includes a turbine runner 13 connected through a converter cover 12 with the engine output shaft 81, a pump impeller 14 connected with the torque-converter output shaft 82, and a stator 16 provided through a one-way clutch 15. An inside space of the torque converter 1 is separated into a converter hydraulic chamber (oil chamber) 17 and a lockup hydraulic chamber 18 by the lockup clutch 11. An oil pump 9 is disposed on an outer circumference of the transmission case 72. A pump-drive transfer mechanism for the oil pump 9 includes a first sprocket 91 provided at an extended portion of the turbine runner 13, a second sprocket 92 provided at a pump shaft of the oil pump 9, and a chain 93 wound around both the sprockets 92 and 93.

The counter gear mechanism 2 is located upstream from the belt-type continuously-variable transmitting mechanism 3 (i.e., in an area upstream beyond the belt-type continuously-variable transmitting mechanism 3 relative to driving-force transfer). The counter gear mechanism 2 functions as a speed-increasing gear mechanism that produces a primary-pulley rotational speed Npri by increasing a driving rotational speed inputted from the engine ENG. This counter gear mechanism 2 includes an input counter gear 21 and an output counter gear 22. In the counter gear mechanism 2, the torque-converter output shaft 82 (drive input shaft) connected to the engine ENG is arranged in parallel with a primary-pulley shaft 83 connected to the belt-type continuously-variable transmitting mechanism 3. The input counter gear 21 is provided to the torque-converter output shaft 82. The output counter gear 22 is provided to the primary-pulley shaft 83, and is engaged or meshed with the input counter gear 21. An upper limit value icmax of a counter gear ratio (speed-increasing ratio) ic of the counter gear mechanism 2 employs a speed-increasing ratio value at which it begins to be judged that a power performance is reduced when the speed-increasing ratio is further increased. On the other hand, a lower limit value icmin of the counter gear ratio ic employs a speed-increasing ratio value at which it begins to be judged that a suppressing effect of the pull-in shock (depression shock) is reduced when the speed-increasing ratio is further lowered. The counter gear ratio ic is set at a value between the upper limit value icmax and the lower limit value icmin, in accordance with a required performance. It is noted that the counter gear ratio ic is set to be lower than 1.

The belt-type continuously-variable transmitting mechanism 3 has a continuously-variable transmitting function (stepless shifting function) that continuously varies a speed ratio between an input rotational speed of primary-pulley shaft 83 and an output rotational speed of secondary-pulley shaft 84 by means of variation of belt contact radius. The belt-type continuously-variable transmitting mechanism 3 includes a primary pulley 31, a secondary pulley 32 and a belt 33. The primary pulley 31 includes a fixed pulley 31a and a slide pulley 31b. The slide pulley 31b slides by a primary hydraulic pressure introduced into a primary hydraulic chamber 34. The secondary pulley 32 includes a fixed pulley 32a and a slide pulley 32b. The slide pulley 32b slides by a secondary hydraulic pressure introduced into a secondary hydraulic chamber 35. The belt 33 is wound around a sheave surface of the primary pulley 31 and a sheave surface of the to secondary pulley 32, namely rotatably connects the primary pulley 31 with the secondary pulley 32 therebetween. Each of the sheave surface of primary pulley 31 and the sheave surface of secondary pulley 32 is formed in a shape of V. The belt 33 includes two sets of laminated rings, and multiple elements formed of punched plate materials. Each of the two sets of laminated rings is formed by a lamination of multiple annular rings from inside to outside thereof. The multiple elements are connected with one another since each element sandwiches the two sets of laminated rings. Thereby, the multiple elements form an annular shape. Each of the multiple elements includes flank surfaces that become in contact with the sheave surfaces of primary and secondary pulleys 31 and 32, at both sides of the each element.

The auxiliary transmitting mechanism 4 can attain a low-speed mode and a high-speed mode for forward running (as shift steps for forward running), and can attain a reverse mode for reverse running (as a shift step for reverse running). That is, the auxiliary transmitting mechanism 4 is a shift mechanism configured to switch these modes in accordance with a running condition of vehicle. The auxiliary transmitting mechanism 4 is provided in series with the belt-type continuously-variable transmitting mechanism 3, and includes a Ravigneaux-type planetary gear train and friction elements for respective shifts (speed-ratio shifts). The Ravigneaux-type planetary gear train includes a double-pinion planetary gear set (S-Fr, P1, P2, R) and a single-pinion planetary gear set (S-Rr, P1, R) which are combined with each other. That is, the Ravigneaux-type planetary gear train includes four rotation elements of a front sun gear S-Fr and a rear sun gear S-Rr, a common carrier C and a ring gear R. The front sun gear S-Fr is provided at the secondary-pulley shaft 84 (=input shaft of auxiliary transmitting mechanism 4), and is meshed or engaged with a first pinion P1. The rear sun gear S-Rr is meshed with a second pinion P2. The common carrier C is directly connected with an output shaft 85 of auxiliary transmitting mechanism 4. The ring gear R is meshed with the second pinion P2. The friction elements for shifts include a low brake L/B, a high clutch H/C and a reverse brake R/B. The low brake L/B is engaged to fix or fasten the rear sun gear S-Rr to the transmission case 72 when the low-speed mode is selected. The high clutch H/C is engaged to connect the common carrier C with the ring gear R when the high-speed mode is selected. The reverse brake R/B is engaged to fix the ring gear R to the transmission case 72 when the reverse mode is selected. It is noted that the high clutch H/C may be constructed in the other structures, namely, the high clutch H/C has only to be located to connect any two rotation elements among the four rotation elements, with each other.

The final reduction gear mechanism 5 and the differential mechanism 6 reduce an output rotational speed derived from the output shaft 85 of auxiliary transmitting mechanism 4, and apply a differential function to the reduced rotational speed so as to transfer this rotational speed to the left and right drive shafts DSL and DSR and the left and right drive wheels TL and TR. The final to reduction gear mechanism 5 includes a first gear 51 provided to the output shaft 85, and a second gear 52 provided to a differential case 61 of differential mechanism 6 and meshed with the first gear 51. The differential mechanism 6 includes a pinion mate shaft 62 supported by the differential case 61, a pinion 63 provided rotatably to the pinion mate shaft 62, a left-side gear 64 meshed with the pinion 63 and equipped with the left drive shaft DSL, and a right-side gear 65 meshed with the pinion 63 and equipped with the right drive shaft DSR. The output shaft 85 of auxiliary transmitting mechanism 4 is equipped with a parking gear 53 located adjacent to the first gear 51.

Figure 2:
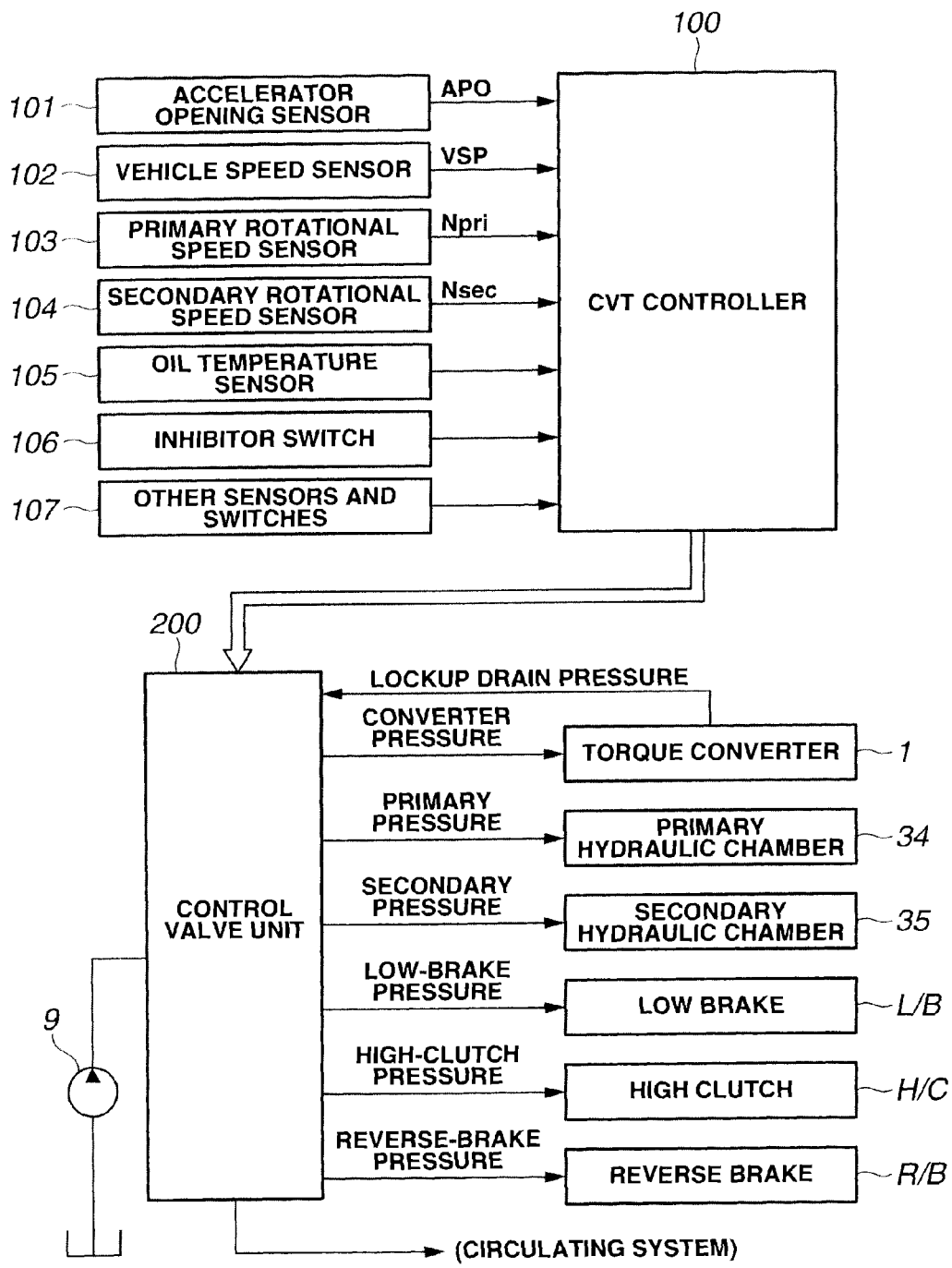
FIG. 2 is a control block diagram showing an electronic control system and a hydraulic control system which carry out a shift control and the like, in the continuously-variable transmission for vehicle in the first embodiment.
Figure 3:
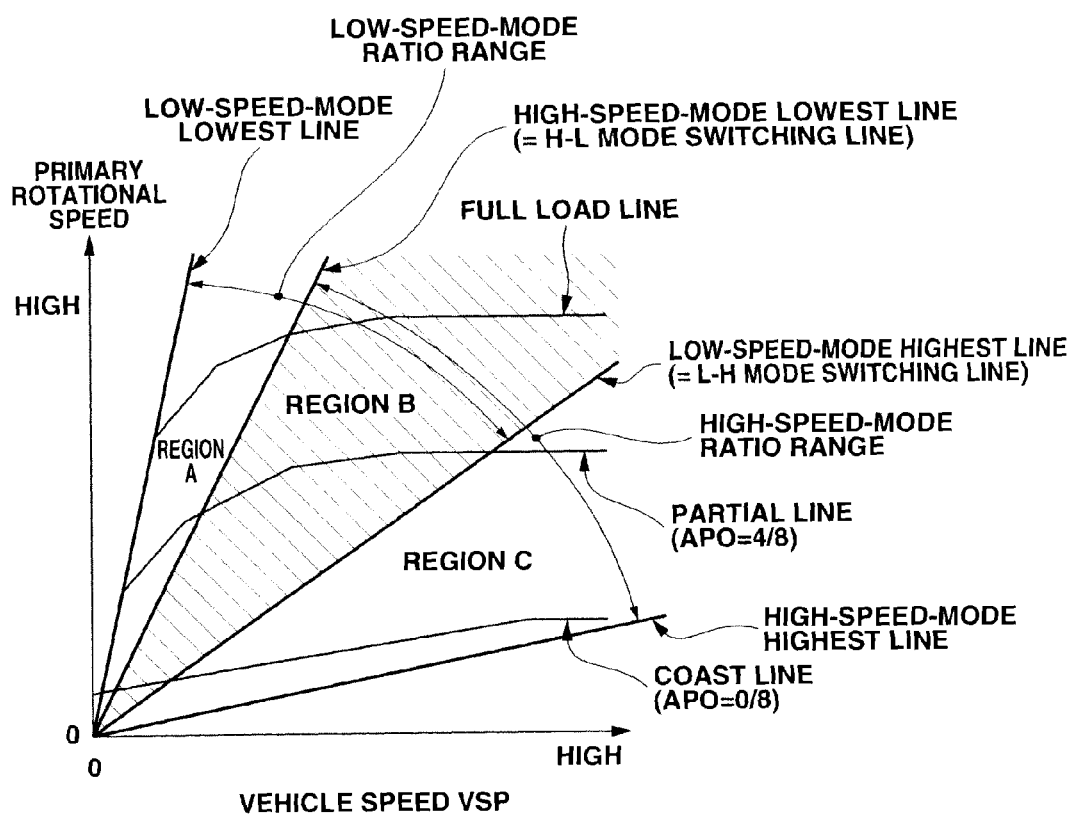
FIG. 3 is a shift-line diagram showing one example of the relation among a vehicle speed, an accelerator opening and a primary rotational speed, in the continuously-variable transmission according to the first embodiment.

FIG. 2 is a control block diagram showing an electronic control system and a hydraulic control system which carry out a shift control and the like, in the continuously-variable transmission for vehicle in the first embodiment. FIG. 3 is a shift-line diagram showing one example of the relation among a vehicle speed, an accelerator opening and the primary rotational speed, in the continuously-variable transmission according to the first embodiment. A configuration of these control systems will now be explained referring to FIGS. 2 and 3.

As shown in FIG. 2, the electronic control system includes a CVT controller 100, and input information sources that supply input information to the CVT controller 100. The CVT controller 100 performs calculation processing based on the input information. Then, the CVT controller 100 outputs a result of the calculation processing to respective actuators of a control valve unit 200, as control commands. The input information sources are an accelerator opening sensor 101 for sensing the accelerator opening APO, a vehicle speed sensor 102 for sensing the vehicle speed VSP, a primary rotational speed sensor 103 for sensing the primary-pulley rotational speed Npri of belt-type continuously-variable transmitting mechanism 3, a secondary rotational speed sensor 104 for sensing a secondary-pulley rotational speed Nsec of belt-type continuously-variable transmitting mechanism 3, an oil temperature sensor 105 for sensing a temperature of transmission working oil, an inhibitor switch 106 for sensing a position of shift lever selected by the driver, and the other sensors and switches etc. 107.

The CVT controller 100 performs a lockup control for releasing/engaging the lockup clutch 11 of torque converter 1. That is, the lockup clutch 11 is released when a driving point (operating point) determined by the vehicle speed VSP and the throttle opening (accelerator opening) APO exists in a predetermined non-lockup region. On the other hand, the lockup clutch 11 is engaged when the driving point determined by the vehicle speed VSP and the throttle opening APO exists in a predetermined lockup region.

The CVT controller 100 performs a control of line pressure while performing a speed ratio control of belt-type continuously-variable transmitting mechanism 3. That is, the CVT controller 100 carries out the line-pressure control for obtaining a target line pressure according to the throttle opening APO and the like, while determining a target primary rotational speed according to the shift-line diagram show in FIG. 3 and the driving point based on the vehicle speed VSP and the throttle opening APO. Then, the CVT controller 100 outputs a speed-ratio control command for obtaining the target primary rotational speed (target speed ratio), to a step motor or the like.

The CVT controller 100 performs a shift control for the auxiliary transmitting mechanism 4. That is, when the low-speed mode is being selected (is in a selected state), the CVT controller 100 maintains the selection of low-speed mode as long as the driving point according to the vehicle speed VSP and the throttle opening APO exists within regions A and B of the shift-line diagram in FIG. 3. When the driving point crosses (passes over) a low-speed-mode highest line (=L-H mode switching line) of the shift-line diagram of FIG. 3, the CVT controller 100 outputs a control command for changing the mode of auxiliary transmitting mechanism 4 from the low-speed mode to the high-speed mode. Moreover, when the high-speed mode is being selected, the CVT controller 100 maintains the selection of high-speed mode as long as the driving point according to the vehicle speed VSP and the throttle opening APO exists within regions B and C of the shift-line diagram in FIG. 3. When the driving point crosses a high-speed-mode lowest line (=H-L mode switching line) of the shift-line diagram of FIG. 3, the CVT controller 100 outputs a control command for changing from the high-speed mode to the low-speed mode.

The hydraulic control system includes the oil pump 9, and the control valve unit 200 for producing various hydraulic pressures on the basis of a discharge pressure of the oil pump 9. The control valve unit 200 includes spool valves such as a regulator valve, a shift control valve, a shift command valve, a pressure reducing valve and a lockup control valve; and actuators such as a line-pressure solenoid, a secondary-pressure solenoid, the step motor and a mode switching solenoid.

The control valve unit 200 performs a lockup hydraulic control of the torque converter 1. That is, the control valve unit 200 introduces a converter pressure into the converter hydraulic chamber 17 and the lockup hydraulic chamber 18 of torque converter 1 when a non-lockup control command is outputted from the CVT controller 100. When a lockup control command is outputted from the CVT controller 100, the control valve unit 200 reduces (drains) the converter pressure only from the lockup hydraulic chamber 18.

The control valve unit 200 performs a speed-ratio hydraulic control of the belt-type continuously-variable transmitting mechanism 3. That is, the control valve unit 200 introduces the primary pressure (primary hydraulic pressure) into the primary hydraulic chamber 34 and also introduces the secondary pressure (secondary hydraulic pressure) into the secondary hydraulic chamber 35, in accordance with the speed-ratio control command derived from the CVT controller 100. Thereby, the belt-type continuously-variable transmitting mechanism 3 realizes the target speed ratio.

The control valve unit 200 performs a shift hydraulic control of the auxiliary transmitting mechanism 4. That is, the control valve unit 200 introduces a low-brake pressure into the low brake L/B of auxiliary transmitting mechanism 4 when a command to maintain the low-speed mode is outputted from the CVT controller 100. The control valve unit 200 introduces a high-clutch pressure into the high clutch H/C of auxiliary transmitting mechanism 4 when a command to maintain the high-speed mode is outputted from the CVT controller 100. The control valve unit 200 introduces a reverse-brake pressure into the reverse brake R/B of auxiliary transmitting mechanism 4 when a command to maintain the reverse mode is outputted from the CVT controller 100. Moreover, the control valve unit 200 carries out a changeover shift for draining the low-brake pressure of low brake L/B and for supplying the high-clutch pressure to the high clutch H/C, when a shift command to change the low-speed mode to the high-speed mode is outputted from the CVT controller 100 under the low-speed mode. The control valve unit 200 carries out a changeover shift for draining the high-clutch pressure of high clutch H/C and for supplying the low-brake pressure to the low brake L/B, when a shift command to change the high-speed mode to the low-speed mode is outputted from the CVT controller 100 under the high-speed mode.

Figure 4:
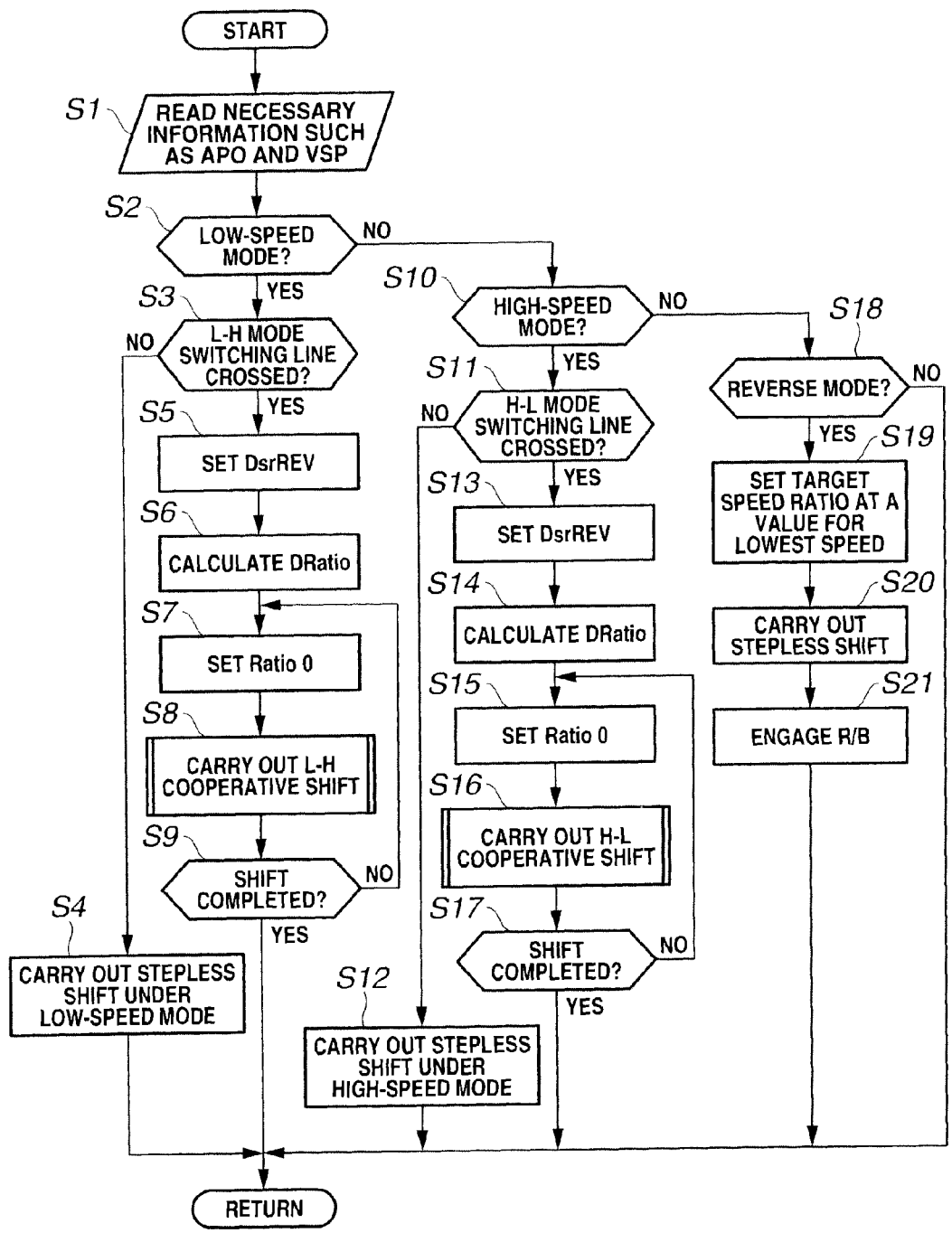
FIG. 4 is a flowchart showing the flow of a shift control process which is executed by a CVT controller in the continuously-variable transmission according to the first embodiment.

FIG. 4 is a flowchart showing a flow of a shift control process which is executed by the CVT controller 100 in the continuously-variable transmission according to the first embodiment. This flowchart, namely, this shift control process of the CVT controller 100 corresponds to a cooperative shift control means or section according to the present invention. Each step of FIG. 4 will now be explained.

At step S1, the controller (CVT controller 100) reads necessary information such as the accelerator opening APO and the vehicle speed VSP. Then, the program proceeds to step S2.

At step S2 subsequent to step S1, the controller judges whether or not the low-speed mode is in a selected state (active state). If YES at step S2, namely, if the low-speed mode is in the selected state; the program proceeds to step S3. If NO at step S2, namely, if a mode other than the low-speed mode is in a selected state; the program proceeds to step S10.

Under a Drive-range, the low-speed mode is regarded as an initial setting mode. That is, the selection of low-speed mode is maintained as long as the driving point according to the vehicle speed VSP and the throttle opening APO exists within the regions A and B of shift-line diagram shown in FIG. 3.

At step S3 subsequent to step S2, the controller judges whether or not the driving point according to the vehicle speed VSP and the throttle opening APO has crossed the low-speed-mode highest line (=L-H mode switching line) of the shift-line diagram shown in FIG. 3. If YES at step S3, namely if the driving point has crossed the L-H mode switching line; the program proceeds to step S5. If NO at step S3, namely, if the driving point has not yet crossed the L-H mode switching line; the program proceeds to step S4.

At step S4 subsequent to step S3, the controller carries out a stepless-shift control of the belt-type continuously-variable transmitting mechanism 3, while maintaining the selection of low-speed mode as the shift step (speed ratio) of auxiliary transmitting mechanism 4. Then, the program proceeds to a RETURN.

At step S5 subsequent to step S3, the controller searches a value of the primary rotational speed by using the shift-line diagram of FIG. 3 and the driving point according to current values of the vehicle speed VSP and throttle opening APO. The controller sets this search result of primary rotational speed as an attainment primary rotational speed DsrREV. Then, the program proceeds to step S6. This attainment primary rotational speed DsrREV is a primary rotational speed value which should be attained by the current values of the vehicle speed VSP and throttle opening APO, namely, is a steady target value for the primary rotational speed.

At step S6 subsequent to step S5, the controller calculates an attainment through speed ratio DRatio by dividing the attainment primary rotational speed DsrREV by the vehicle speed VSP and a final reduction ratio IF. Then, the program proceeds to step S7. This attainment through speed ratio DRatio is a value of through speed ratio which should be attained by the current values of vehicle speed VSP and throttle opening APO, namely, is a steady target value for the through speed ratio.

At step S7 subsequent to step S6 or step S9, the controller sets a target through speed ratio Ratio0 for varying an actual through speed ratio Ratio from its value at the time of shift start to the attainment through speed ratio DRatio with a predetermined transient response. Then, the program proceeds to step S8.

Here, the target through speed ratio Ratio0 is a transient (temporary) target value for through speed ratio. The predetermined transient response is, for example, a first-order lag response. The target through speed ratio Ratio0 is set so as to gradually approach the attainment through speed ratio DRatio. The actual through speed ratio Ratio is recalculated as need basis, from the current values of vehicle speed VSP and primary rotational speed Npri.

At step S8 subsequent to step S7, the controller caries out a shift control for changing the low-speed mode to the high-speed mode in the auxiliary transmitting mechanism 4. During this shift control of mode change, the controller also carries out a stepless shift control in the belt-type continuously-variable transmitting mechanism 3 so as to cause the actual through speed ratio Ratio to remain equal to the target through speed ratio Ratio0. It is noted that this control at step S8 will be referred to as L-H cooperative shift. Then, the program proceeds to step S9.

At step S9 subsequent to step S8, the controller judges whether or not the L-H cooperative shift has been completed. If YES at step S9, namely, if the L-H cooperative shift has been already completed; the program proceeds to the RETURN. If NO at step S9, namely, if the L-H cooperative shift is during execution; the program returns to step S7.

At step S10 subsequent to step S2, the controller judges whether or not the high-speed mode is in the selected state. If YES at step S10, namely, if the high-speed mode is being selected; the program proceeds to step S11. If NO at step S10, namely, if a mode other than the high-speed mode is being selected; the program proceeds to step S18. When the high-speed mode is in the selected state, the selection of high-speed mode is maintained as long as the driving point according to the vehicle speed VSP and the throttle opening APO exists within the regions B and C of the shift-line diagram shown in FIG. 3.

At step S11 subsequent to step S10, the controller judges whether or not the driving point according to the vehicle speed VSP and the throttle opening APO has crossed the high-speed-mode lowest line (=H-L mode switching line) of the shift-line diagram shown in FIG. 3. If YES at step S11, namely, if the driving point has crossed the H-L mode switching line; the program proceeds to step S13. If NO at step S11, namely, if the driving point has not yet crossed the H-L mode switching line; the program proceeds to step S12.

At step S12 subsequent to step S11, the controller carries out a stepless shift control in the belt-type continuously-variable transmitting mechanism 3 while maintaining the selection of high-speed mode as the shift step of auxiliary transmitting mechanism 4. Then, the program proceeds to the RETURN.

At step S13 subsequent to step S11, the controller searches a value of primary rotational speed by using the shift-line diagram of FIG. 3 and the driving point according to current values of vehicle speed VSP and throttle opening APO in the same manner as step S5. The controller sets this search result of primary rotational speed as the attainment primary rotational speed DsrREV. Then, the program proceeds to step S14.

At step S14 subsequent to step S13, the controller calculates the attainment through speed ratio DRatio by dividing the attainment primary rotational speed DsrREV by the vehicle speed VSP and the final reduction ratio IF in the same manner as step S6. Then, the program proceeds to step S15.

At step S15 subsequent to step S14 or step 17, the controller sets the target through speed ratio Ratio0 for varying the actual through speed ratio Ratio from its value at the time of shift start to the attainment through speed ratio DRatio with a predetermined transient response, in the same manner as step S7. Then, the program proceeds to step S16.

At step S16 subsequent to step S15, the controller carries out a shift control for changing from the high-speed mode to the low-speed mode in the auxiliary transmitting mechanism 4. During this shift control of mode change, the controller also carries out a stepless shift control of the belt-type continuously-variable transmitting mechanism 3 so as to cause the actual through speed ratio Ratio to remain equal to the target through speed ratio Ratio0. It is noted that this control at step S16 will be referred to as H-L cooperative shift. Then, the program proceeds to step S17.

At step S17 subsequent to step S16, the controller judges whether or not the H-L cooperative shift has been completed. If YES at step S17, namely, if the H-L cooperative shift has been already completed; the program proceeds to the RETURN. If NO at step S17, namely, if the H-L cooperative shift is during execution; the program returns to step S15.

At step S18 subsequent to step S10, the controller judges whether or not a Reverse-range is in a selected state (the position of shift lever is in a Reverse-range). If YES at step S18, the program proceeds to step S19. If NO at step S18, the program proceeds to the RETURN.

At step S19 subsequent to step S18, the controller sets the target (stepless) speed ratio of belt-type continuously-variable transmitting mechanism 3 at a lowest-side speed ratio value (i.e., a speed ratio value for lowest speed). Then, the program proceeds to step S20.

At step S20 subsequent to step S19, the controller carries out a stepless shift to cause the belt-type continuously-variable transmitting mechanism 3 to achieve the target speed ratio (lowest-side speed ratio value). Then, the program proceeds to step S21.

At step S21 subsequent to step S20, the controller engages the reverse brake R/B of auxiliary transmitting mechanism 4. Then, the program proceeds to the RETURN.

Next, operations will be explained. The operations in the continuously-variable transmission for vehicle according to the first embodiment will be explained by being divided into the four of "Problems when aiming for size and weight reductions of continuously-variable transmission", "Shift control operations in respective modes", "Setting operations of counter gear ratio", and "Operations of cooperative shift control in shift transient period".

"Problems when Aiming for Size and Weight Reductions of Continuously-Variable Transmission"

A continuously-variable transmission for a vehicle needs to realize an ideal that "a quick response is secured at the time of low-speed running of vehicle or at the time of vehicle start, and a low engine rotational speed and a low fuel consumption are secured at the time of high-speed running of vehicle", while transmitting a power (energy) generated from the engine at a maximum efficiency. That is, "speed-ratio width (Low gear ratio/High gear ratio)" needs to be enlarged.

In a case of belt-type continuously-variable transmitting mechanism in which a steel belt is wound around two pulleys to transmit power between the two pulleys, the speed-ratio width is determined by a ratio between curvature radiuses of the belt. Therefore, a belt-type continuously-variable transmitting mechanism having a great speed-ratio width is realized by designing a large-size pulley enabling a wide range of curvature radius in magnitude and by winding a belt with a small radius (and a large radius).

However, since a compact vehicle has a small engine room, there is no space to mount a continuously-variable transmission including the large-size pulley. Moreover, the pulley has a heaviest weight among structural components of belt-type continuously-variable transmission. Hence, in the case that the size of pulley is made large, the weight of belt-type continuously-variable transmission is increased to adversely affect a fuel-consumption performance.

Therefore, by employing a structure of combination of the belt-type continuously-variable transmitting mechanism and the auxiliary transmitting mechanism, a plurality of stepless shift regions can be obtained. Thereby, a jumped-up (enlarged) speed-ratio width can be realized while reducing a pulley diameter and achieving the downsizing and weight saving. This idea that the belt-type continuously-variable transmitting mechanism is combined with the auxiliary transmitting mechanism has been proposed, for example, by Japanese Patent Application Publication No. 60-037455 (corresponding to UK Patent Application No. 2144814). However, very high-level techniques are necessary to pursue a drivability (smoothness and quick response) while controlling both of the belt-type continuously-variable transmitting mechanism and the auxiliary transmitting mechanism. An actual equipment by this idea (a transmission as production version) has not yet been realized. Particularly, users (owners) have a strong impression that the belt-type continuously-variable transmission is "smooth by virtue of stepless shift". However, in the case of this idea, the auxiliary transmitting mechanism is added, that is, a discontinuity is added to the intrinsic "stepless (continuous variation)". Hence, in a case that the smoothness and the favorable response which are conflicting with each other (opposite requirements) are pursued when a shift is performed by the auxiliary transmitting mechanism, its control becomes very difficult.

Accordingly, as disclosed in Japanese Patent Application Publication No. 5-079554, it is conceivable that when a shift step (speed ratio) of auxiliary transmitting mechanism is changed, a cooperative shift for varying a speed ratio of belt-type continuously-variable transmission provided upstream from the auxiliary transmitting mechanism is performed in synchronization with the change of shift step of auxiliary transmitting mechanism so as to maintain the through speed ratio at a constant value or so as to smoothly vary the through speed ratio in a region between just before and just after the cooperative shift. By employing this cooperative shift, rotational speed variations of torque converter and engine are suppressed when the shift of auxiliary transmitting mechanism is performed. Accordingly, a shift shock due to these inertia torques is prevented, and it can be described that this cooperative shift is effective in suppressing a variation of output-shaft torque during the "inertia phase" for which the input rotational speed is varied.

However, the cooperative shift control is a control for the input rotational speed of auxiliary transmitting mechanism, and cannot control the input torque. Hence, during the "torque phase" for which only the output-shaft torque is varied and for which the input rotational speed is not varied, the output-shaft torque is reduced in response to a changeover shift for releasing a friction element (which has been engaged before this shift) and for engaging a friction element (which has been released before this shift). It is noted that this "torque phase" constitutes a part of shift transient period of auxiliary transmitting mechanism, as mentioned above.

For example, in a case of upshift from the low-speed mode to the high-speed mode, when a transfer torque of low brake L/B which is in engaged state under the low-speed mode starts to decrease and a transfer torque of high clutch H/C which is to be engaged under the high-speed mode starts to increase, the both friction elements of low brake L/B and high clutch H/C become in engaged state (interlock), so that the output-shaft torque starts to decrease. Then, when the transfer torque of high clutch H/C has increased and reached a level capable of transmitting the input torque, the low brake L/B is released. In this case, the output-shaft torque is reduced because of the speed ratio for high-speed mode.

On the other hand, a cooperative control between engine torque and shift is known as a technique capable of controlling the input torque of auxiliary transmitting mechanism. In order to suppress the reduction of output-shaft torque, it is conceivable that the engine torque is increased at a moment when the output-shaft torque is reduced in the auxiliary transmitting mechanism by using this technique. However, it is difficult to detect a progress state of shift in the "torque phase" during which the input rotational speed is not varied, and moreover, a control for engine torque has a response delay even though a desired time period for torque increase is instantaneous. Hence, when trying to actually increase the engine torque, a timing of this engine-torque increase deviates from the timing of reduction of output-shaft torque, so that a width of torque variation during the "torque phase" might be enlarged resulting in an adverse effect. Therefore, it can be described that the cooperative control between engine torque and shift cannot be used in practice.

As mentioned above, in the case that the combination of the belt-type continuously-variable transmitting mechanism and the auxiliary transmitting mechanism is employed, the following problem remains to be solved. That is, in the case that the combination of the belt-type continuously-variable transmitting mechanism and the auxiliary transmitting mechanism is used, the shift shock called "pull-in shock" cannot be prevented from occurring due to the reduction of output-shaft torque during the "torque phase" of the shift of auxiliary transmitting mechanism. This greatly damages the shift quality.

[Shift Control Operations in Respective Modes]

A shift control operation at the time of selection of low-speed mode, a shift control operation at the time of selection of high-speed mode, a shift control operation at the time of selection of reverse mode, and a shift control operation at the time of mode change will be explained referring to FIGS. 4 and 5-8.

Shift Control Operation at the Time of Selection of Low-Speed Mode

For example, when the Drive-range is being selected so that the low-speed mode is set as the initial setting mode, and the driving point according to the vehicle speed VSP and the throttle opening APO exists within the regions A and B of shift-line diagram shown in FIG. 3; the flow of step S1→step S2→step S3→step S4→RETURN is repeated in the flowchart of FIG. 4. In this case, at step S4, the stepless shift control of belt-type continuously-variable transmitting mechanism 3 is performed while the selection of low-speed mode is maintained as the shift step of auxiliary transmitting mechanism 4.

Figure 5A:
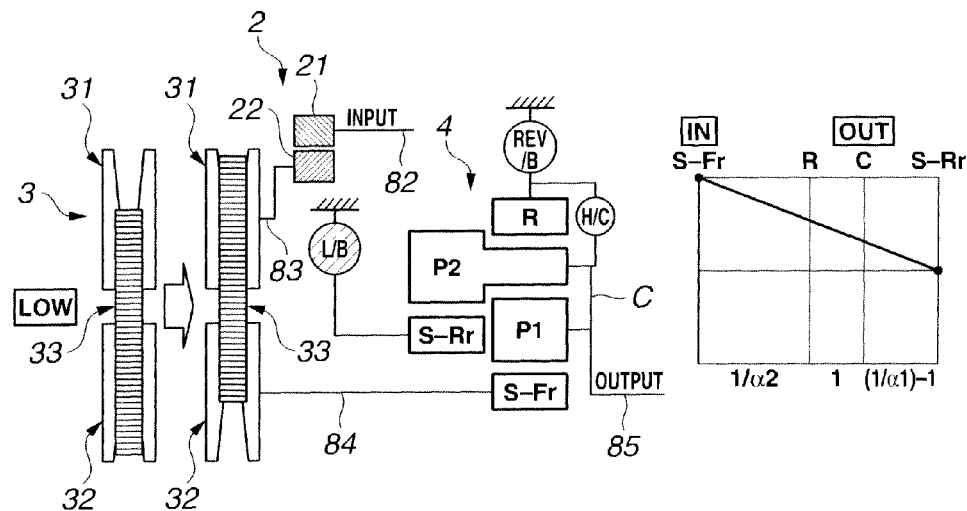
FIG. 5A is a view showing a counter gear mechanism, a belt-type continuously-variable transmitting mechanism and an auxiliary transmitting mechanism, for explaining a shift control operation when a low-speed mode is being selected.
Figure 5B:
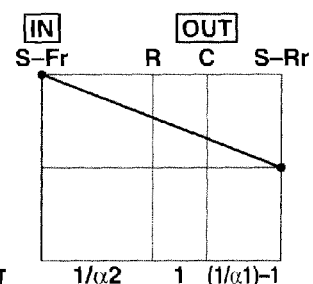
FIG. 5B shows a speed-line diagram of the auxiliary transmitting mechanism under the low-speed mode.

That is, at the time of selection of low-speed mode, as shown in FIG. 5A, the counter gear mechanism 2 increases an input rotational speed derived from the torque-converter output shaft 82, by means of the mesh between the input counter gear 21 and the output counter gear 22. This increased rotational speed becomes an output rotational speed of the primary-pulley shaft 83. In the belt-type continuously-variable transmitting mechanism 3, the speed ratio is continuously (in a stepless manner) controlled in a region between a low-speed-mode lowest line and the low-speed-mode highest line, and thereby, the input rotational speed derived from primary-pulley shaft 83 is changed to an output rotational speed of secondary-pulley shaft 84 according to the speed ratio. In the auxiliary transmitting mechanism 4, the low-speed mode using a reduction ratio is set by the engagement of low brake L/B, so that an input rotational speed derived from the secondary-pulley shaft 84 is decreased. This decreased rotational speed becomes an output rotational speed of the output shaft 85 of auxiliary transmitting mechanism 4. A speed-line diagram (lever diagram) under the low-speed mode is as shown in FIG. 5B. That is, a speed-reduction lever is determined by the input rotational speed derived from secondary-pulley shaft 84 and the engagement of low brake L/B. Thus, the rotational speed inputted from the front sun gear S-Fr is reduced, and this reduced rotational speed is outputted from the common carrier C.

Shift Control Operation at the Time of Selection of High-Speed Mode

For example, when the driving point according to the vehicle speed VSP and the throttle opening APO exists within the regions B and C of shift-line diagram shown in FIG. 3 after the low-speed mode has been changed to the high-speed mode; the flow of step S1→step S2→step S10→step S11→step S12→RETURN is repeated in the flowchart of FIG. 4. In this case, at step S12, the stepless shift control of belt-type continuously-variable transmitting mechanism 3 is performed while the selection of high-speed mode is maintained as the shift step of auxiliary transmitting mechanism 4.

Figure 6A:
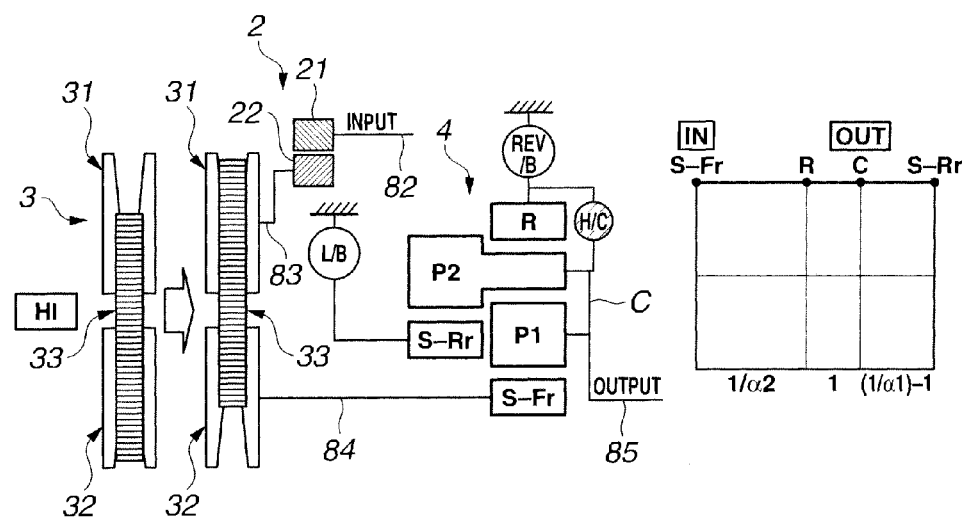
FIG. 6A is a view showing the counter gear mechanism, the belt-type continuously-variable transmitting mechanism and the auxiliary transmitting mechanism, for explaining a shift control operation when a high-speed mode is being selected.
Figure 6B:
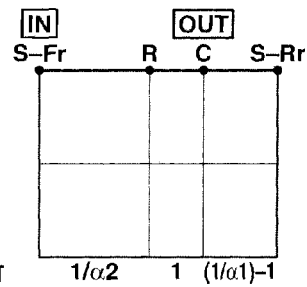
FIG. 6B shows a speed-line diagram of the auxiliary transmitting mechanism under the high-speed mode.

That is, at the time of selection of high-speed mode, as shown in FIG. 6A, the counter gear mechanism 2 increases the input rotational speed derived from the torque-converter output shaft 82, by means of the mesh between the input counter gear 21 and the output counter gear 22. This increased rotational speed becomes the output rotational speed of primary-pulley shaft 83. In the belt-type continuously-variable transmitting mechanism 3, the speed ratio is continuously (in a stepless manner) controlled in a region between a high-speed-mode highest line and the high-speed-mode lowest line, and thereby, the input rotational speed derived from primary-pulley shaft 83 is changed to the output rotational speed of secondary-pulley shaft 84 according to the speed ratio. In the auxiliary transmitting mechanism 4, the high-speed mode using an even ratio is set by the engagement of high clutch H/C, so that the input rotational speed derived from the secondary-pulley shaft 84 directly becomes (is equal to) the output rotational speed of the output shaft 85 of auxiliary transmitting mechanism 4. A speed-line diagram (lever diagram) under the high-speed mode is as shown in FIG. 6B. That is, an even-speed lever is determined by the input rotational speed derived from secondary-pulley shaft 84 and the engagement of high clutch H/C. Thus, the rotational speed inputted from the front sun gear S-Fr is not changed, and this rotational speed is outputted from the common carrier C, as it is.

Shift Control Operation at the Time of Selection of Reverse Mode

For example, when the select lever (shift lever) is manipulated into a position of Reverse-range; the flow of step S1→step S2→step S10→step S18→step S19→step S20→step S21→RETURN is repeated in the flowchart of FIG. 4. In this case, at step S20, the shift that sets the belt-type continuously-variable transmitting mechanism 3 at its lowest-side speed ratio value is performed. Moreover at step S21, the control that engages the reverse brake R/B of auxiliary transmitting mechanism 4 is performed.

Figure 7A:
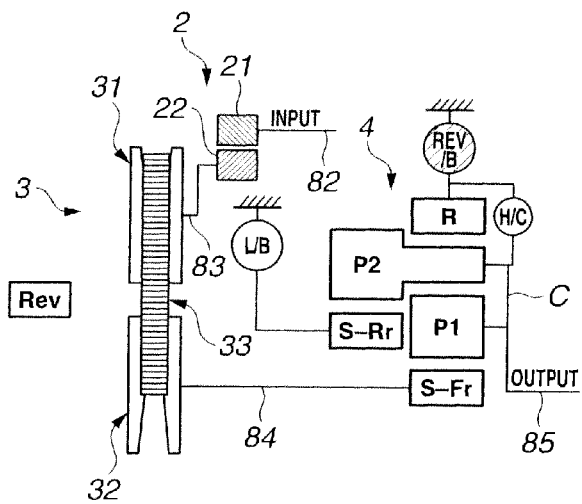
FIG. 7A is a view showing the counter gear mechanism, the belt-type continuously-variable transmitting mechanism and the auxiliary transmitting mechanism, for explaining a shift control operation when a reverse mode is being selected.
Figure 7B:
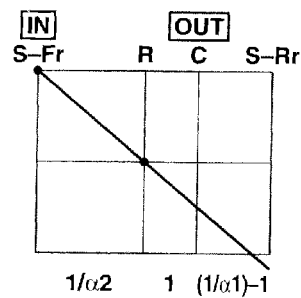
FIG. 7B shows a speed-line diagram of the auxiliary transmitting mechanism under the reverse mode.

That is, at the time of selection of reverse mode, as shown in FIG. 7A, the counter gear mechanism 2 increases the input rotational speed derived from torque-converter output shaft 82, by means of the mesh between the input counter gear 21 and the output counter gear 22. This increased rotational speed becomes the output rotational speed of primary-pulley shaft 83. In the belt-type continuously-variable transmitting mechanism 3, the speed ratio is controlled to become equal to the lowest-side speed ratio value, and thereby, the input rotational speed derived from primary-pulley shaft 83 is changed to the output rotational speed of secondary-pulley shaft 84 according to the lowest-side speed ratio value. In the auxiliary transmitting mechanism 4, the reverse mode producing a reverse rotation is set by the engagement of reverse brake R/B, so that the input rotational speed derived from secondary-pulley shaft 84 is made to take a value having a reversed sign. This reversed rotational speed becomes the output rotational speed of output shaft 85 of auxiliary transmitting mechanism 4. A speed-line diagram (lever diagram) under the reverse mode is as shown in FIG. 7B. That is, a reverse-speed lever is determined by the input rotational speed derived from secondary-pulley shaft 84 and the engagement of reverse brake R/B. Thus, the rotational speed inputted from the front sun gear S-Fr is changed to a rotational speed value having the reversed sign, and this reversed rotational speed is outputted from the common carrier C.

Shift Control Operation at the Time of Mode Change

Figure 8A:
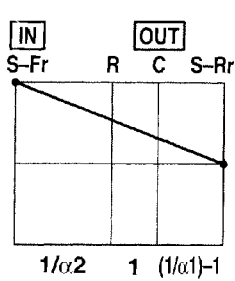
FIGS. 8A to 8C are explanatory views explaining a shift control operation when the low-speed mode is changed to the high-speed mode, by using a rotational-speed relation among respective rotation elements of the auxiliary transmitting mechanism.
Figure 8B:
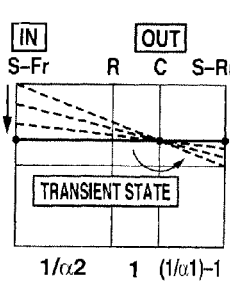
Figure 8C:
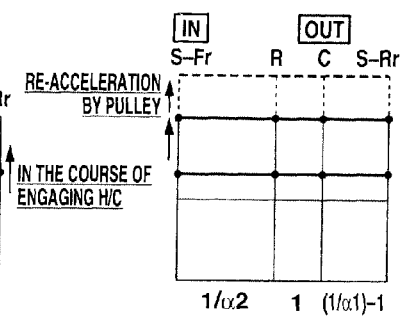

For example, in the case that the low-speed mode is changed to the high-speed mode, when the low-speed mode is active before this mode change, the speed-reduction lever is determined by the input rotational speed of secondary-pulley shaft 84 and the engagement of low brake L/B as shown in FIG. 8A. Thereby, the rotational speed inputted from the front sun gear S-Fr is decreased and then outputted from the common carrier C. When a mode-change transient state for which the low brake L/B continues to be released and also the high clutch H/C continues to be engaged (i.e., the mode-change transient state means a state appearing in the middle of the releasing operation of low brake L/B and the engaging operation of high clutch H/C), the lever of speed-line diagram is rotated and varied from the speed-reduction lever to the even-speed lever by lowering the rotational speed of the front sun gear S-Fr by means of the shift of belt-type continuously-variable transmitting mechanism 3 toward its Low side while maintaining the output rotational speed (vehicle speed) by means of a releasing progress of low brake L/B and an engaging progress of high clutch H/C, as shown in FIG. 8B. Then, when the high-speed mode becomes active by the completion of engagement of high clutch H/C, a shift of belt-type continuously-variable transmitting mechanism 3 which returns toward its High side increases the input rotational speed of front sun gear S-Fr, as shown in FIG. 8C. Thereby, the even-speed lever also rises in response to the increase of rotational speed of front sun gear S-Fr. Thereby, the output rotational speed (vehicle speed) is increased to accelerate the vehicle. Until the rotational speed of front sun gear S-Fr reaches a level equal to its rotational speed value taken before the mode change, the vehicle continues to be accelerated by the speed-ratio control of belt-type continuously-variable transmitting mechanism 3, for example, even if the rotational speed of engine ENG remains constant. Moreover, in a case that a further acceleration is required, the input rotational speed of front sun gear S-Fr is again increased by increasing the rotational speed of engine ENG or the like. Thereby, the acceleration can be conducted again.

[Setting Operations of Counter Gear Ratio]

Figure 9:
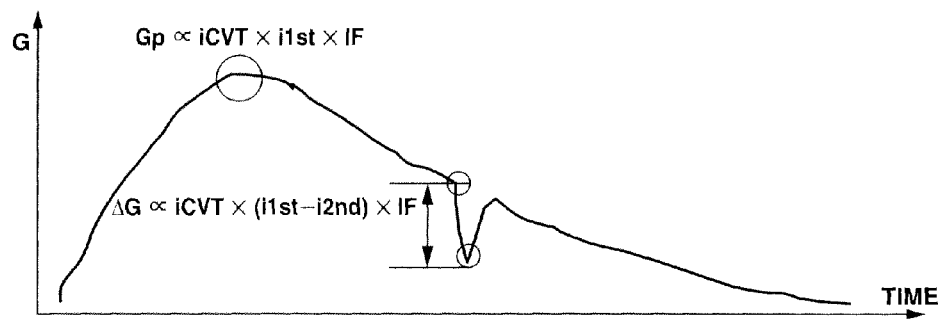
FIG. 9 is a time chart showing an acceleration characteristic at the time of transition from an increase of vehicle speed by accelerator depression under the low-speed mode, into the shift to the high-speed mode by accelerator return, for explaining a setting of counter gear ratio is in the counter gear mechanism of the continuously-variable transmission according to the first embodiment.

The counter gear ratio (speed-increasing ratio) is of counter gear mechanism 2 is set at a value between the upper limit value icmax and the lower limit value icmin, namely, is set to satisfy a relation of icmax≤ic≤icmin in accordance with a required performance. The upper limit value icmax is a speed-increasing ratio value which causes the driver to begin to judge that the power performance decreases when the speed-increasing ratio is further increased, as mentioned above. The lower limit value icmin is a speed-increasing ratio value which causes the driver to begin to judge that the suppressing effect of pull-in shock decreases when the speed-increasing ratio is further lowered, as mentioned above. The setting operations of the counter gear ratio ic will now be explained referring to FIG. 9.

At first, the power performance is represented by a following formula (1).

$$Te \times ic \times iCVT \times i1st \times iF \times \text{tire(wheel)radius/weight} \qquad (1)$$

Wherein Te denotes the engine torque, ic denotes the counter gear ratio, iCVT denotes the pulley ratio, i1st denotes a gear ratio of auxiliary transmitting mechanism 4 for the low-speed mode (for example, i1st=1.821), and IF denotes the final gear ratio. That is, the power performance is evaluated or judged by a value proportional to the input torque (engine torque Te×counter gear ratio ic) and a total gear ratio (iCVT×i1st×IF).

The pull-in shock is represented by a following formula (2).

$$Te \times ic \times iCVT \times \{i1st - i2nd\} \times IF \times \text{tire radius/weight} \quad (2)$$

Wherein i2nd denotes a gear ratio of auxiliary transmitting mechanism 4 for the high-speed mode (for example, i2nd=1.0). That is, the pull-in shock is evaluated or judged by a value proportional to the input torque (engine torque Te×counter gear ratio ic) and a difference {i1st−i2nd} between gear ratios of auxiliary transmitting mechanism 4.

Therefore, as shown in the above formula (2), it can be recognized that the input torque is reduced so that the pull-in shock can be reduced when the counter gear ratio ic is set at a ratio value for increasing the rotational speed. In addition, the suppressing effect of pull-in shock becomes higher as the counter gear ratio ic is more reduced toward its speed-increasing side. However, as shown in the above formula (1), the power performance becomes lower as the counter gear ratio ic is more reduced toward its speed-increasing side.

On the other hand, in a case that a manipulation for returning the accelerator is conducted after the accelerator has been depressed to accelerate the vehicle with the low-speed mode selected, for example, the shift for changing from the low-speed mode to the high-speed mode is performed with the crossover of L-H mode switching line. In this case, as shown by a characteristic of acceleration G of FIG. 9, there is a demand to suppress an acceleration reducing amount ΔG at the time of shift according to the accelerator return, while securing a high acceleration Gp at the time of accelerator depression.

Therefore, in order to satisfy two requirements of the securement of power performance and the suppression of pull-in shock which are conflicting with each other, the counter gear ratio ic is set at a value between the upper limit value icmax and the lower limit value icmin (icmax≤ic≤icmin) in accordance with a required performance, as mentioned above. Moreover, in a case that the demand to suppress the pull-in shock should have a higher priority than the demand to secure the power performance in consideration of a vehicle specification or the like; the counter gear ratio ic is set at a relatively low value selected from the range between the upper limit value icmax and the lower limit value icmin, namely, is set at a value falling within a lower-value range of this setting allowable range (icmax≤ic≤icmin) given for compatibility of the two requirements. On the other hand, in a case that the demand to secure the power performance should have a higher priority than the demand to suppress the pull-in shock in consideration of the vehicle specification or the like; the counter gear ratio ic is set at a relatively high value selected from the range between the upper limit value icmax and the lower limit value icmin.

[Operations of Cooperative Shift Control in Shift Transient Period]

An operation of cooperative shift control for the change from the low-speed mode to the high-speed mode, an operation of cooperative shift control for the change from the high-speed mode to the low-speed mode, a maintaining operation of the actual through speed ratio in the inertia phase by the cooperative shift, and a suppressing operation of the reduction of output torque in the torque phase will now be explained referring to FIGS. 4, 10 and 11.

Operation of Cooperative Shift Control for the Change from the Low-Speed Mode to the High-Speed Mode When the low-speed mode is active (in the selected state) and the driving point according to vehicle speed VSP and throttle opening APO has crossed the low-speed-mode highest line (=L-H mode switching line) of the shift-line diagram shown in FIG. 3; the program proceeds as step S1→step S2→step S3→step S5→step S6→step S7→step S8→step S9 in the flowchart of FIG. 4. Then, the flow of step S7→step S8→step S9 is repeated, until it is determined that the shift has been completed at step S9. When the shift completion is determined at step S9, the program proceeds from step S9 to the RETURN.

That is, the target through speed ratio Ratio0 which brings the actual through speed ratio Ratio from its value taken at the start time of shift to the attainment is through speed ratio DRatio with a predetermined transient response is set at step S7. Then, the L-H cooperative shift is performed at step S8. In the L-H cooperative shift, the shift control for changing the low-speed mode to the high-speed mode is executed in the auxiliary transmitting mechanism 4, and in addition during this shift control of mode change, the stepless shift control of belt-type continuously-variable transmitting mechanism 3 is executed so as to maintain the actual through speed ratio Ratio at a magnitude equal to the target through speed ratio Ratio0.

Operation of Cooperative Shift Control for the Change from the High-Speed Mode to the Low-Speed Mode When the high-speed mode is active (in the selected state) and the driving point according to vehicle speed VSP and throttle opening APO has crossed the high-speed-mode lowest line (=H-L mode switching line) of the shift-line diagram shown in FIG. 3; the program proceeds as step S1→step S2→step S10→step S11→step S13→step S14→step S15→step S16→step S17 in the flowchart of FIG. 4. Then, the flow of step S15→step S16→step S17 is repeated, until it is determined that the shift has been completed at step S17. When the shift completion is determined at step S17, the program proceeds from step S17 to the RETURN.

That is, the target through speed ratio Ratio0 which brings the actual through speed ratio Ratio from its value taken at the start time of shift to the attainment through speed ratio DRatio with a predetermined transient response is set at step S15. Then, the H-L cooperative shift is performed at step S16. In the H-L cooperative shift, the shift control for changing the high-speed mode to the low-speed mode is executed in the auxiliary transmitting mechanism 4, and in addition, during this shift control of mode change, the stepless shift control of belt-type continuously-variable transmitting mechanism 3 is executed so as to maintain the actual through speed ratio Ratio at a magnitude equal to the target through speed ratio Ratio0.

Figure 10:
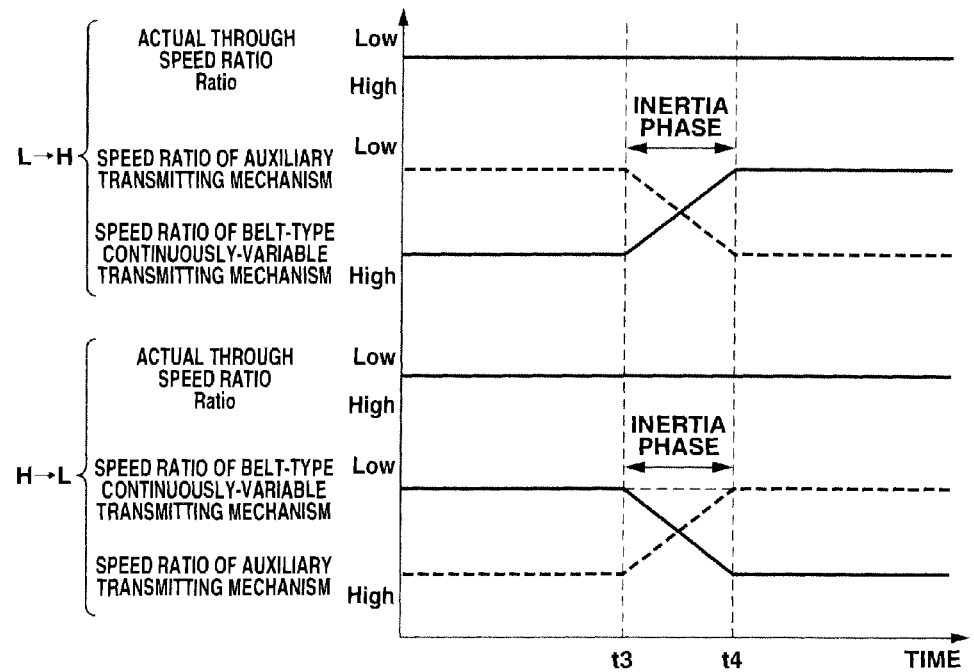
FIG. 10 is a time chart showing respective characteristics of an actual through speed ratio, a speed ratio of auxiliary transmitting mechanism and a speed ratio of belt-type continuously-variable transmitting mechanism, for explaining a cooperative shift control in an inertia phase at the time of each of an upshift (L→H) and a downshift (H→L).

Maintaining Operation of Actual Through Speed Ratio in the Inertia Phase by the Cooperative Shift In the inertia phase included in a shift transient period (shift-execution period) of the mode change from the low-speed mode to the high-speed mode, the speed ratio of auxiliary transmitting mechanism 4 varies from Low(-speed side) to High(-speed side) and the speed ratio of belt-type continuously-variable transmitting mechanism 3 varies from High(-speed side) to Low(-speed side) by the execution of L-H cooperative shift, as shown by an upper part of FIG. 10. Accordingly, the actual through speed ratio Ratio which is given by combining the actual speed ratio of auxiliary transmitting mechanism 4 with the actual speed ratio of belt-type continuously-variable transmitting mechanism 3 is maintained at a constant value for the inertia phase.

In the inertia phase included in a shift transient period (shift-execution period) of the mode change from the high-speed mode to the low-speed mode, the speed ratio of auxiliary transmitting mechanism 4 varies from High(-speed side) to Low(-speed side) and the speed ratio of belt-type continuously-variable transmitting mechanism 3 varies from Low(-speed side) to High(-speed side) by the execution of H-L cooperative shift, as shown by a lower part of FIG. 10. Accordingly, the actual through speed ratio Ratio which is given by combining the actual speed ratio of auxiliary transmitting mechanism 4 with the actual speed ratio of belt-type continuously-variable transmitting mechanism 3 is maintained at a constant value for the inertia phase.

Suppressing Operation of the Reduction of Output Torque in the Torque Phase

A suppressing operation of the reduction of output torque (output-shaft torque) during the torque phase in the case of upshift from the low-speed mode to the high-speed mode will now be explained referring to a time chart shown in FIG. 11.

The upshift for changing the low-speed mode to the high-speed mode starts at time point t1. In a shift preparation phase given between time point t1 and time point t2, the low brake L/B of auxiliary transmitting mechanism 4 starts to be released and the high clutch H/C starts to be engaged. That is, in the shift preparation phase; the low brake L/B is made to slip slightly as shown by a characteristic of torque capacity of low brake L/B in FIG. 11, and the high clutch H/C is maintained approximately at zero point of torque capacity as shown by a characteristic of torque capacity of high clutch H/C in FIG. 11.

Then, the torque phase starts from time point t2. In the torque phase, a changeover of torque share is performed, as shown by the characteristics of torque capacity of low brake L/B and high clutch H/C in FIG. 11. That is, in the torque phase, a torque share of low brake L/B (torque amount that is transferred by the low brake L/B) is gradually reduced, and this reduced amount is added to a torque share of high clutch H/C. In the torque phase, a reduction amount ΔTa of output torque becomes great as shown by a dotted-line characteristic of output torque in FIG. 11 in a case of continuously-variable transmission which does not include the counter gear mechanism 2. On the other hand, in the case of continuously-variable transmission including the counter gear mechanism 2 according to the first embodiment, a reduction amount ΔTb of output torque is smaller than the reduction amount ΔTa as shown by a solid-line characteristic of output torque in FIG. 11.

Then, the inertia phase starts from time point t3. In the inertia phase, the cooperative shift is performed as shown by ratio characteristics of auxiliary transmitting mechanism 4 and belt-type continuously-variable transmitting mechanism in FIG. 11. That is, in the inertia phase, the cooperative shift that causes the speed ratio of auxiliary transmitting mechanism 4 and the speed ratio of belt-type continuously-variable transmitting mechanism to vary cooperatively with each other is executed. Accordingly, a total ratio (=through speed ratio) is maintained at a constant value as shown by a total ratio characteristic in FIG. 11. Moreover, the output torque which has decreased increases gradually and returns to its level indicated before this shift, as shown by the solid-line characteristic of output torque in FIG. 11.

Then, a shift finishing phase starts from time point t4. In the shift finishing phase, the low brake L/B of auxiliary transmitting mechanism 4 is completely released and the high clutch H/C of auxiliary transmitting mechanism 4 is completely engaged, as shown by the characteristics of torque capacity of low brake L/B and high clutch H/C in FIG. 11. Then, the shift finishing phase ends at time point t5, and the high-speed mode starts when the shift finishes at time point 5.

Next, advantageous effects will now be explained. According to the vehicle continuously-variable transmission in the first embodiment, the following listed advantageous effects can be obtained.

(1) The continuously-variable transmission for a vehicle in the first embodiment includes the belt-type continuously-variable transmitting mechanism 3 connected to the drive source (engine ENG) and configured to continuously vary the speed ratio of belt-type continuously-variable transmitting mechanism 3; and the auxiliary transmitting mechanism 4 provided in series with the belt-type continuously-variable transmitting mechanism 3 and configured to attain the plurality of shift steps for forward running of the vehicle. The continuously-variable transmission in the first embodiment further includes the speed-increasing gear mechanism (counter gear mechanism 2) provided upstream from the auxiliary transmitting mechanism 4 and configured to increase the input rotational speed of auxiliary transmitting mechanism 4. Accordingly, since the belt-type continuously-variable transmitting mechanism 3 is provided in series with the auxiliary transmitting mechanism 4, the number of ranges in which the speed ratio of belt-type continuously-variable transmitting mechanism 3 can be continuously set corresponds to the number of the plurality of shift steps of the auxiliary transmitting mechanism 4. Hence, the speed-ratio width can be enlarged toward the Low side so as to enhance the responsiveness of vehicle start, and also the speed-ratio width can be enlarged toward the High side so as to improve the energy saving (to improve fuel economy in the case of engine vehicle). Moreover, since the speed-increasing gear mechanism is provided upstream from the auxiliary transmitting mechanism 4, the input torque to the auxiliary transmitting mechanism 4 is reduced because of the speed increase by the speed-increasing gear mechanism as compared with a case where the input torque derived from the drive source is directly inputted to the auxiliary transmitting mechanism 4. Therefore, the reduction amount of output-shaft torque can be suppressed during the "torque phase" when the shift of auxiliary transmitting mechanism 4 is carried out. This is because the reduction amount of output-shaft torque during the "torque phase" is given by a value according to the magnitude of input torque to the auxiliary transmitting mechanism 4, a difference between gear ratios of auxiliary transmitting mechanism 4 before and after the shift, and the like. Therefore, the shift quality at the time of shift of auxiliary transmitting mechanism 4 can be improved while realizing the enlargement of speed-ratio width that attains the preferable responsiveness of vehicle start and the preferable energy saving performance (low fuel consumption).

(2) In the continuously-variable transmission according to the first embodiment, the speed-increasing gear mechanism (counter gear mechanism 2) is configured to set the speed increasing ratio of the speed-increasing gear mechanism at a value between the upper limit value icmax and the lower limit value icmin in accordance with a required performance. This upper limit value icmax is a speed-increasing-ratio value at which it begins to be judged that the power performance is reduced when the speed increasing ratio (counter gear ratio ic) is further increased. On the other hand, the lower limit value (icmin) is a speed-increasing-ratio value at which it begins to be judged that the suppressing effect of pull-in shock is reduced when the speed increasing ratio is further lowered. Accordingly, even although the speed-increasing gear mechanism (counter gear mechanism 2) is added into a power transmitting pathway of the continuously-variable transmission, both of the power performance and shift performance can be favorably ensured. Moreover, the balance between the power performance and shift performance can be adjusted in accordance with a required performance, while maintaining the favorable power performance and favorable shift performance. That is, a priority can be adjustably given to the power performance or the shift performance freely according to the required performance.

(3) In the continuously-variable transmission according to the first embodiment, the speed-increasing gear mechanism (counter gear mechanism 2) is provided upstream from the belt-type continuously-variable transmitting mechanism 3, and this speed-increasing gear mechanism 2 is configured to increase the driving rotational speed inputted from the drive source (engine ENG) and to output the increased driving rotational speed to the belt-type continuously-variable transmitting mechanism 3 as the primary rotational speed of belt-type continuously-variable transmitting mechanism 3. Accordingly, the input torque to the belt-type continuously-variable transmitting mechanism 3 is lowered. Hence, the pulley of belt-type continuously-variable transmitting mechanism 3 does not need to be reinforced or enlarged in size, and a belt friction can be reduced, so that an energy saving effect (low fuel-consumption effect) can be greatly expected.

(4) In the continuously-variable transmission according to the first embodiment, the speed-increasing gear mechanism (counter gear mechanism 2) includes the input counter gear 21 and the output counter gear 22 engaged with the input counter gear 21. This input counter gear 21 is provided to the driving input shaft (torque-converter output shaft 82) connected to the drive source (engine ENG), and the output counter gear 22 is provided to the primary-pulley shaft 83 of the belt-type continuously-variable transmitting mechanism 3. The driving input shaft (torque-converter output shaft 82) is disposed in parallel with the primary-pulley shaft 83 in the speed-increasing gear mechanism (counter gear mechanism 2). Accordingly, the speed-increasing gear mechanism (counter gear mechanism 2) can be constructed simply by the input counter gear 21 and the output counter gear 22 constantly meshed with the input counter gear 21. Moreover, a degree of freedom in layout for the driving input shaft (torque-converter output shaft 82) with which the torque converter 1 and the like are connected and the primary-pulley shaft 83 with which the primary pulley 31 is connected can be made high.

(5) In the continuously-variable transmission according to the first embodiment, the auxiliary transmitting mechanism 4 is configured to attain at least the low-speed mode and the high-speed mode as the shift steps for the forward running. Further, the continuously-variable transmission according to the first embodiment includes the cooperative shift control section (FIG. 4). This cooperative shift control section is configured to vary the speed ratio of belt-type continuously-variable transmitting mechanism 3 in synchronization with the shift of auxiliary transmitting mechanism 4 so as to smoothly vary the through speed ratio of whole of the continuously-variable transmission, when the forward shift step of auxiliary transmitting mechanism 4 is changed from one mode to another mode in accordance with a shift request. Accordingly, the reduction of output-shaft torque during the torque phase and the variation of through speed ratio during the inertia phase are suppressed at the time of shift of auxiliary transmitting mechanism 4. Therefore, a smooth shift having a favorable shift quality can be achieved while suppressing a generation of shift shock and a generation of feeling of slow shift (prolonged shift).

Although the invention has been described above with reference to the first embodiment according to the present invention, the invention is not limited to the embodiment described above. Modifications and variations of the embodiment described above will occur to those skilled in the art in light of the above teachings.

For example, the structure that arranges the speed-increasing gear mechanism (counter gear mechanism 2) upstream from the belt-type continuously-variable transmitting mechanism 3 has been explained in the first embodiment, as a preferable example. However, according to the present invention, the speed-increasing gear mechanism may be arrange in the other areas upstream from the auxiliary transmitting mechanism 4. For example, the speed-increasing gear mechanism may be arranged between the belt-type continuously-variable transmitting mechanism 3 and the auxiliary transmitting mechanism 4.

Moreover, in the first embodiment, the example that the continuously-variable transmission is applied to the vehicle equipped with the engine ENG as its drive source has been explained. However, the continuously-variable transmission according to the present invention is also applicable to a hybrid vehicle equipped with engine and motor as its drive sources, an electric vehicle equipped with a motor as its drive source, a fuel cell vehicle, and the like.

This application is based on a prior Japanese Patent Application No. 2009-166444 filed on Jul. 15, 2009. The entire contents of this Japanese Patent Application are hereby incorporated by reference.

The scope of the invention is defined with reference to the following claims.

What is claimed is:

1. A continuously-variable transmission for a vehicle, comprising:
    a belt-type continuously-variable transmitting mechanism connected to a drive source and configured to continuously vary a speed ratio of the belt-type continuously-variable transmitting mechanism;
    an auxiliary transmitting mechanism provided in series with the belt-type continuously-variable transmitting mechanism and configured to attain a plurality of shift steps for a forward running of the vehicle; and
    a speed-increasing gear mechanism provided upstream from the auxiliary transmitting mechanism and configured to increase an input rotational speed of the auxiliary transmitting mechanism,
    wherein the speed-increasing gear mechanism is configured to set a speed increasing ratio of the speed-increasing gear mechanism at a value between an upper limit value and a lower limit value in accordance with a required performance,
    wherein the upper limit value is a speed-increasing-ratio value at which it begins to be judged that a power performance is reduced when the speed increasing ratio is further increased, and
    wherein the lower limit value is a speed-increasing-ratio value at which it begins to be judged that a suppressing effect of pull-in shock is reduced when the second speed-increasing-ratio is further lowered.

2. The continuously-variable transmission as claimed in claim 1, wherein
    the speed-increasing gear mechanism is provided upstream from the belt-type continuously-variable transmitting mechanism; and the speed-increasing gear mechanism is configured to increase a driving rotational speed inputted from the drive source and to output the increased driving rotational speed to the belt-type continuously-variable transmitting mechanism as a primary rotational speed of the belt-type continuously-variable transmitting mechanism.

3. The continuously-variable transmission as claimed in claim 2, wherein the speed-increasing gear mechanism includes an input counter gear and an output counter gear engaged with the input counter gear;

the input counter gear is provided to a driving input shaft connected to the drive source, and the output counter gear is provided to a primary-pulley shaft of the belt-type continuously-variable transmitting mechanism; and the driving input shaft is disposed substantially in parallel with the primary-pulley shaft in the speed-increasing gear mechanism.

4. The continuously-variable transmission as claimed in claim 2, wherein the auxiliary transmitting mechanism is configured to attain at least a low-speed mode and a high-speed mode as the shift steps for the forward running;

the continuously-variable transmission further comprises a cooperative shift control section; and the cooperative shift control section is configured to vary the speed ratio in synchronization with a shift of the auxiliary transmitting mechanism so as to smoothly vary a through speed ratio of a whole of the continuously-variable transmission, when one of the shift steps is changed from one mode to another mode in accordance with a shift request.

* * * * *